JOHN G. WILLIAMS
INVENTOR.
BY Daniel H. Bobb
atty

Jan. 11, 1966 J. G. WILLIAMS 3,228,242
APPARATUS FOR TESTING PUMPS
Filed June 19, 1963 4 Sheets-Sheet 3

JOHN G. WILLIAMS
INVENTOR.
BY Daniel H. Bobis
atty

Jan. 11, 1966   J. G. WILLIAMS   3,228,242
APPARATUS FOR TESTING PUMPS
Filed June 19, 1963   4 Sheets-Sheet 4

JOHN G. WILLIAMS
INVENTOR.

BY Daniel H. Bobis
atty

United States Patent Office 3,228,242
Patented Jan. 11, 1966

3,228,242
APPARATUS FOR TESTING PUMPS
John G. Williams, Warren Township, Somerset County, N.J., assignor to Worthington Corporation, Harrison, N.J., a corporation of Delaware
Filed June 19, 1963, Ser. No. 288,074
12 Claims. (Cl. 73—168)

This invention relates generally to pumps and more particularly to an apparatus for testing pumps which operate at high ambient pressures and temperatures.

At present one of the major costs involved in the production of pumps which are designed to operate under high ambient conditions of pressure and temperature is the testing of such pumps under conditions approximating actual operating conditions of the particular application for which they are designed.

Heretofore this testing has been accomplished by the use of a large complex closed loop system equipped with valves, flow meters, pump head differential pressure gauges, heating means, coolers, etc. all of which are exposed to the high temperature and high pressure conditions of the tests.

The cost of such test loop systems for a large pump including the equipment and constructing the apparatus usually exceeds one million dollars.

Furthermore, in addition to this expense it has been found that the operation and maintenance of the test facilities run about $500 or more per testing hour so that for a conventional thousand hour life test a cost of $500,000 or more will be entailed.

In order to appreciate the significance of the present invention it is necessary to recognize that test procedures for large pumps are in two basic categories
 (1) Performance testing
 (2) Endurance testing.

In performance testing in addition to the hydraulic performance of the pump at normal speed which establishes the head, capacity and efficiency characteristics of the pump being tested, the following data is usually required.
 (a) Free rotor—forward and reverse flow characteristics
 (b) Locked rotor—forward and reverse flow characteristics
 (c) Axial radial thrust
 (d) Net positive suction head (NPSH) data.

This phase of the testing of large pumps may be accomplished at a relatively low cost with a closed loop system using cold water at low pressure. The construction cost of such a loop is modest and all of the performance testing can be done by one engineer and a technician.

In endurance testing the large complex closed loop system above mentioned has been required because delivery time and equipment reliability are the major considerations and costs of the facilities and cost of the testing as outlined above have been considered subservient to these factors.

It is to effect appreciable reduction in endurance testing costs both in the equipment and the maintenance and operation thereof to which the present invention is particularly directed.

This desirable result is accomplished in the present invention by providing a relatively simple testing apparatus for rotating equipment having a shaft, wherein a test housing is provided about the shaft and a source of fluid at high pressure is delivered to the test housing with means for heating said fluid to relatively high temperature; and a radial thrust loader assembly connected to the shaft in the test housing is disposed to rotate in said test housing, the radial thrust loader assembly in assembled position acting as a hydrostatis—hydrodynamic thrust bearing; and having operatively associated means adjustable to obtain the correct magnitude and angular direction of radial thrust on the pump elements under test.

Accordingly, it is an object of the present invention to provide a relatively inexpensive test facility for the endurance testing of large capacity pumps which operate at high ambient pressure and temperature conditions; which test facility is relatively inexpensive to maintain and operate and hence aids in reducing the ultimate cost of manufacture of such pumps.

It is another object of the present invention to provide a closed loop testing system for large capacity pumps designed to operate under conditions of high ambient pressure and temperature wherein the seals, the bearings and all related pump components will be exposed to conditions of service comparable or substantially comparable to the conditions of actual service under which the elements are normally required to operate.

With this and other objects in view further objects and advantages of the invention will become evident from the following description with reference to the accompanying drawings, in which.

Figure 1:
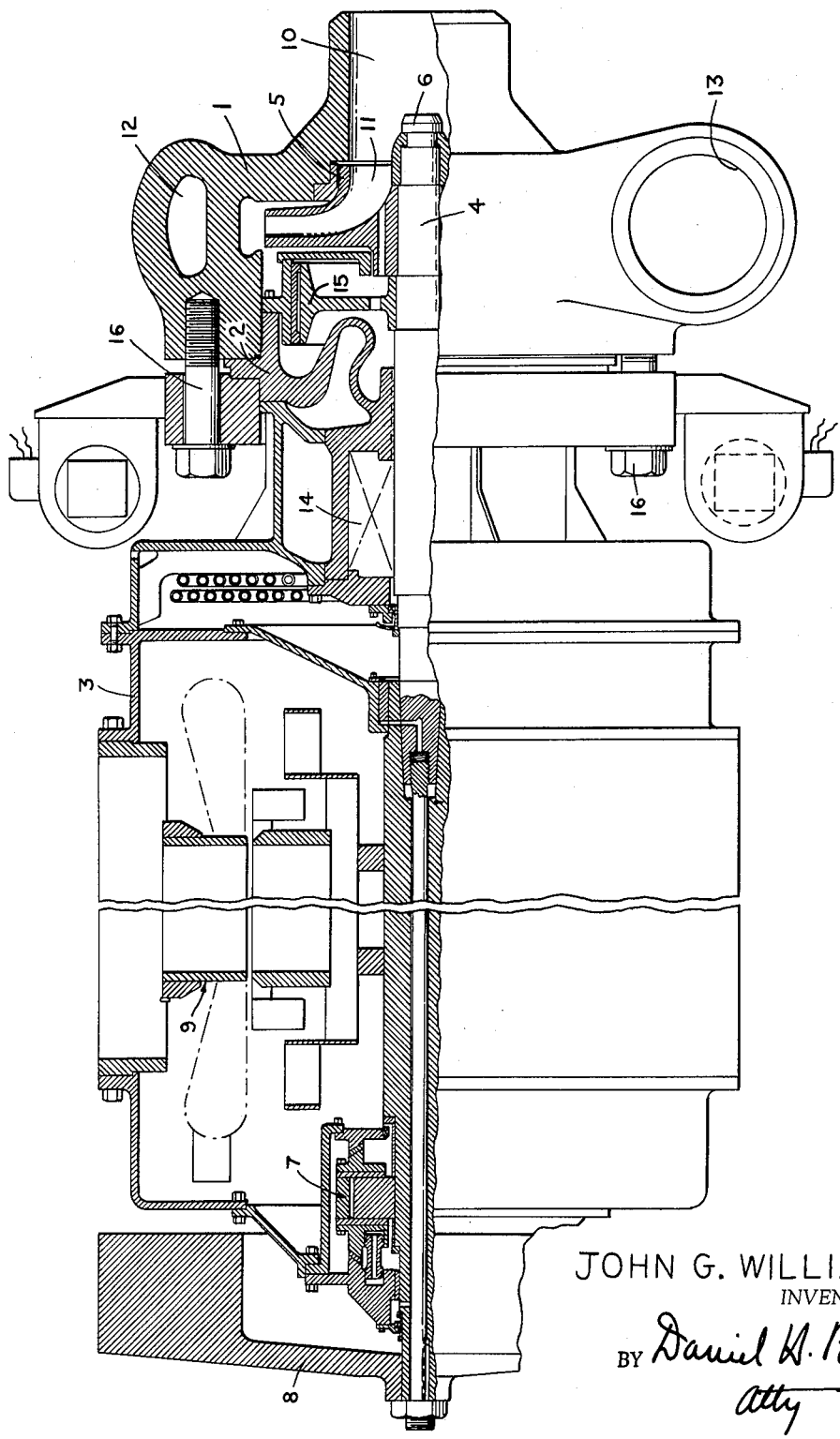
FIGURE 1 is an illustration of one type of pump partially in side elevation and partially in section which can be tested by the present invention.

Referring to the drawings, FIGURE 1 shows a seal type pump of large capacity which is only one form of pump to which the present invention is particularly applicable.

It will be understood that with minor modifications as will be understood by those skilled in the art the present invention can be applied equally as well to canned rotor motor driven pumps or other types of pumps or any pumping structure to the extent that the present facility need only be adapted to replace the pump casing portion of the apparatus.

The pump shown in FIGURE 1 includes a pump casing 1 connected to a seal housing generally designated 2 which in turn is connected to the motor housing 3. Extending through the respective motor housing, seal housing and pump casing is a shaft 4 which can either be integral or can be as shown in the drawings as composed of two portions which when assembled form an integral member.

The shaft extends into the pump casing and connected to one end of the shaft is an impeller member 5 which is held onto the end of the shaft by means of a nut 6.

At the end of the shaft remote from the impeller end a thrust bearing assembly generally designated 7 is provided for holding the shaft in axial position.

Outwardly of the thrust bearing a flywheel 8 may be provided for purposes well known in the art.

A motor 9 is operatively associated with the shaft 4 and the motor 9 when placed in operation rotates the shaft and the impeller connected thereto so that fluid delivered to the suction inlet 10 formed in the pump casing will enter the suction eye 11 of the impeller and be discharged through suitable discharge passage 12 and discharge outlet 13 formed in the pump casing.

A seal arrangement generally designated 14 is provided about the shaft 4 on the side of the impeller remote from the suction inlet 10 to prevent leakage of the high ambient pressure fluid along the shaft 4.

The shaft is supported against radial movement by a hydrostatic journal bearing generally designated 15 which is disposed between the seal 14 and the impeller 5 and supports the shaft against radial movement during operation.

The subject matter of the seal arrangement 14 is variously illustrated in my U.S. Patent 3,085,808 issued April 16, 1963 and in co-pending application U.S. Serial No. 66,684 filed November 28, 1960 and that of the thrust bearing in my co-pending application U.S. Serial No. 279,383 filed May 10, 1963, now Patent No. 3,192,000.

Since these elements do not form part of the present invention they are not described more fully.

In the present illustrated form of the invention the test facilities are particularly designed for the testing of the sealing arrangement 14. However it will be equally applicable to the testing of any of the other portions of the equipment as will appear obvious from the following description of the test facility itself.

TEST FACILITY

In order to understand the application of the closed test loop facility as applied to the above described pump and shown in FIGURES 2, 3, 4, 5 and 6 of the drawings attention is first called to the fact that in FIGURE 1 the pump casing 1 is shown as connected to the intermediate seal housing 2 by means of a plurality of circumferentially spaced bolts 16.

Figure 2:
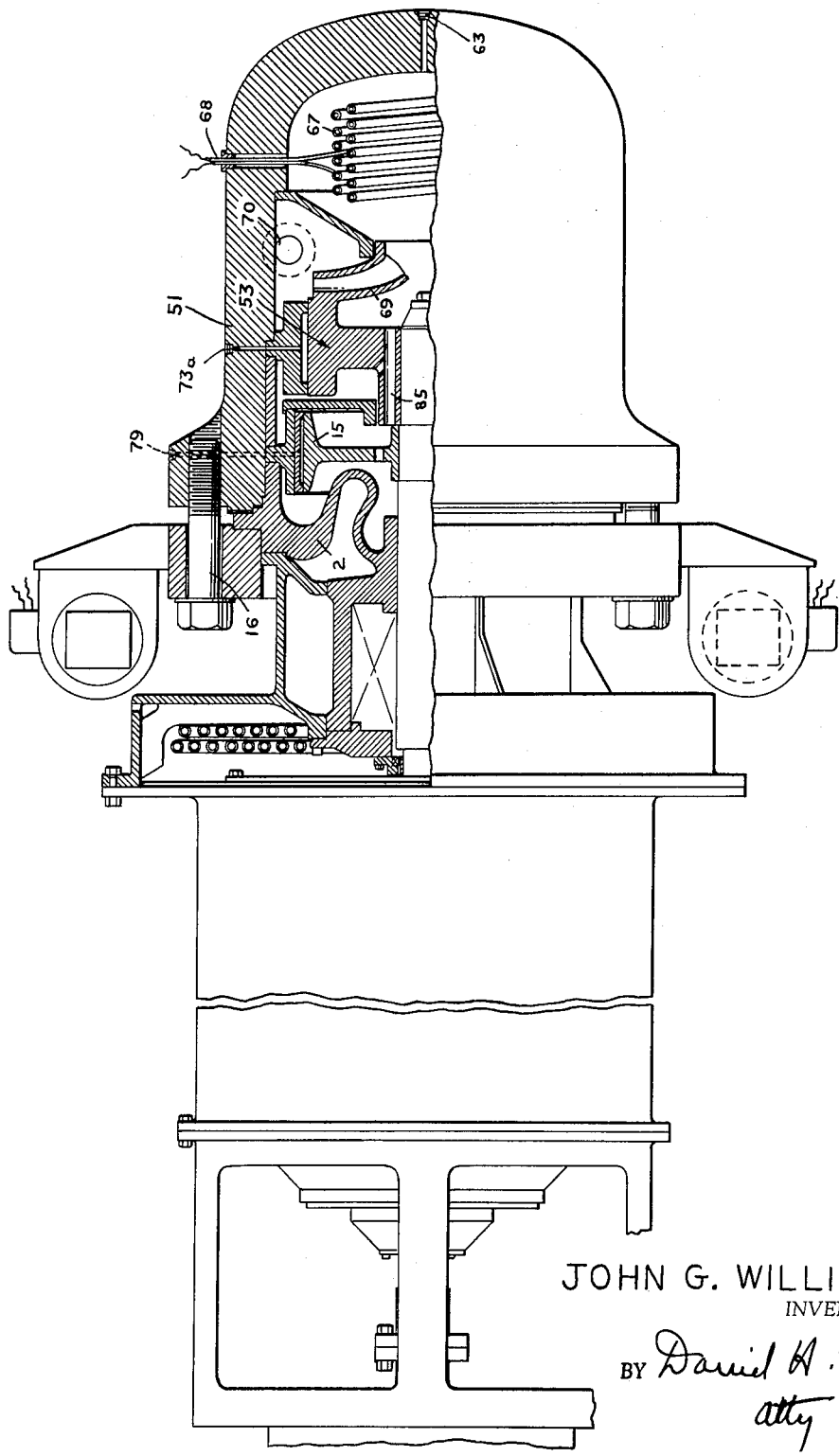
FIGURE 2 is a view of said pump disposed in position for testing in accordance with the present invention.
Figure 3:
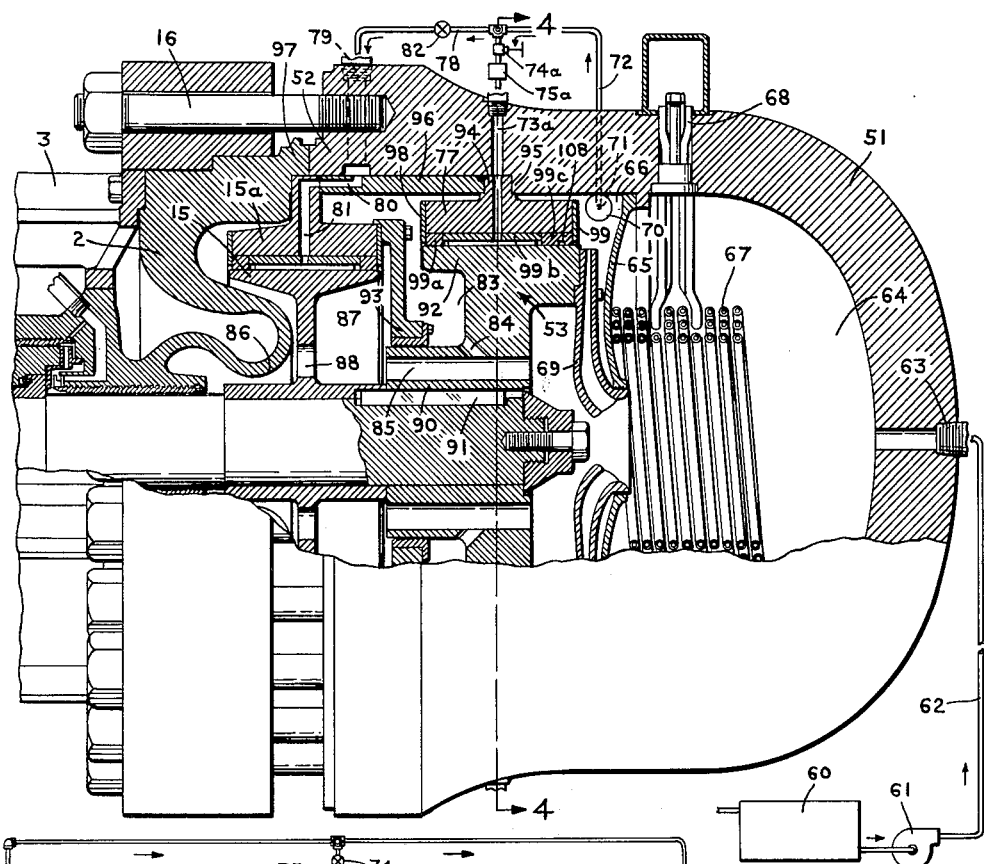
FIGURE 3 is an enlarged half section of the pump and testing apparatus showing the hydraulic arrangement associated with the testing apparatus.

It can readily be seen with reference to FIGURES 2 and 3 that when the closed loop testing facility of the present invention is established the actual pump casing 1 and the impeller 5 are removed.

In place of the pump casing 1 a generally semi-spherical test housing 51 with a suitable shoulder 52 is connected to the seal housing 2 at the point where the hydrostatic journal bearing support 15a is connected for support the hydrostatic bearing 15 in turn supporting the shaft 5.

In place of the full size impeller a radial thrust loader assembly generally designated 53 is connected to the end of the shaft 4 by the standard threaded member 6, the radial thrust loader assembly having the same weight and moment of inertia as the full size impeller it replaces.

In order to eliminate the need for high cost closed loop system as has been used heretofore it is necessary in this arrangement not only to duplcate the thrust characteristics of the impeller but in addition the conditions of service with respect to pressure and temperature and for the simulating of the critical speed of the rotating assembly, etc.

This is accomplished in a two-fold manner. First, a suitable hydraulic system is provided for delivering the fluid used in testing and circulating the fluid through the closed test loop facility at the desired pressure and temperature.

Second, the radial thrust loader assembly is especially designed to provide the fluid energy to the bearing portion of the assembly more fully described hereinafter so as to recreate the radial thrust normally generated by the impeller under actual operating conditions of the pump being tested.

THE HYDRAULIC SYSTEM

The hydraulic system is disclosed in FIGURE 3 as including a sump 60 having a source of fluid being used for testing purposes, a charging pump 61 has its suction connected to the pump and discharges through line 62 to the inlet port 63 formed in the semi-spherical casing member 51.

The fluid at the source will be of substantially room temperature and therefore will be delivered to the inlet port from the charging pump at any desired pressure for example about 2,000 p.s.i.g. and at a temperature of approximately 70 degrees.

In the present testing process the quantity of fluid which is delivered may be relatively low for example 20 gallons per hour and the reason why the quantity of charging fluid is relatively low is that it only serves to provide make-up fluid for the general operation of the testing facility.

When the testing fluid is delivered by pump 61, line 62 and port 63 to the inner chamber 64 of the semi-spherical test housing 51 it is at a pressure of approximately 2000 p.s.i.g. or any other desired pressure and will exert an axial force against the shaft 4 to simulate the actual conditions of operation insofar as axial thrust is concerned. In addition it will fill substantially the entire cavity which contains the hydrostatic bearing arrangement 15 and the radial thrust loader assembly 53 with which the fluid coacts to provide the desired result of the present invention.

A partition as at 65 divides off a discharge chamber 66 from the inner chamber 64 to receive fluid from the radial thrust loader assembly during operation of the test facility as hereinafter described.

Since these pumps operate at a normally high temperature the fluid will be heated in the space by means of a suitable heating mechanism. In the present invention this mechanism consists of an electric heating coil designated 67 which is provided with a sealed terminal assembly 68 to connect it to any suitable source of electric current, not shown.

During operation of the test facility the test fluid in the inner chamber 64 will be passed through the radial thrust loader assembly by being drawn into the eye of an impeller portion generally designated 69 and will be discharged into the discharge chamber 66. An outlet port 70 for the discharge chamber 66 in the semi-spherical test housing 51 communicates by lines 71 and 72 to a plurality of bearing supply ports as at $73a$, $73b$, $73c$ and $73d$ of the radial thrust loader assembly 53. In the lines which connect to each of the bearing supply ports there is disposed a corresponding plurality of valves and a pressure differential gauge each designated $74a$, $74b$, $74c$ and $74d$ and $75a$, $75b$, $75c$ and $75d$ respectively.

Figure 4:
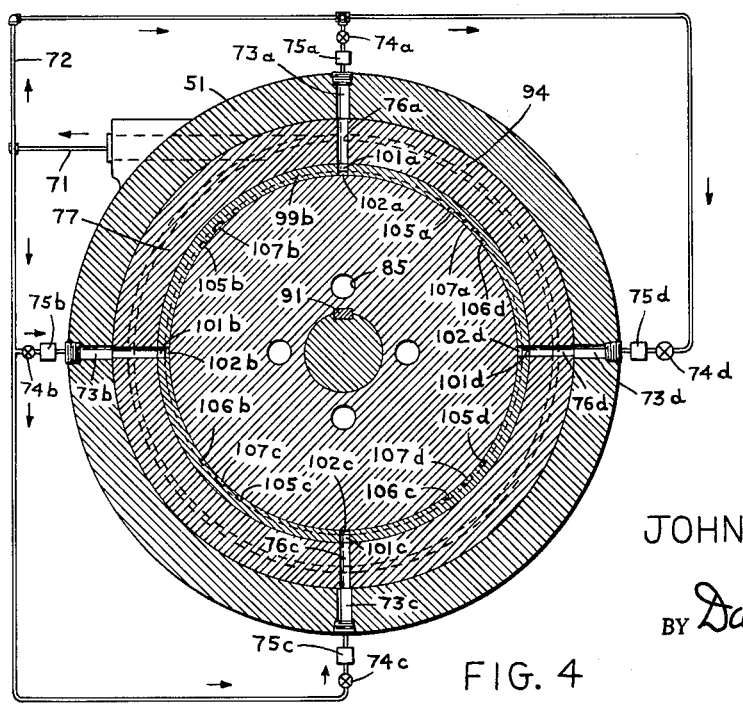
FIGURE 4 is a cross-section taken on line 4—4 of FIGURE 3 and showing the related piping of the hydraulic arrangement.

In the drawings as at FIGURE 4 the ports $73a$, $73b$, $73c$ and $73d$ are shown at approximately 90 degrees from each other which in the preferred form of the invention is the means for adjusting the respective pressures on either side of the radial thrust loader assembly to provide the desired direction of radial thrust therein.

However, it will be understood by those skilled in the art that this is only representative and there could be as many ports and angles as may be desired without departing from the scope of the present invention.

These ports in turn communicate with coincident ports $76a$, $76b$, $76c$ and $76d$ in the bearing stator 77 and serve to feed the respective quadrants of the bearing stator 77 for the purposes and objects set forth below.

Line 71 also communicates with a line 78 in turn communicating with port 79 which is connected to the bores 80 and 81 communicating with the hydrostatic-hydrodynamic bearing assembly 15 and a valve 82 is provided in this line so that fluid can also be delivered to this hydrodynamic and hydrostatic bearing 15 at its normal operating condition for maintaining this bearing during test operations to reproduce the normal operating conditions for the pump.

Fluid which leaks out of the radial thrust loader assembly will be discharged in a direction remote from the space 64 and into a collecting space 83. The fluid in space 83 passes from the collecting space 83 through a port 84 into the return passage 85 which communicates with the space 64 and will then be recirculated as above described.

Similarly from the hydrostatic-hydrodynamic bearing assembly 15 the leakage fluid from either side will be discharged into the spaces 86 and 87 and pass from space 86 through passage 88 and be returned with the fluid from space 87 through the return passage 85 for similar recirculation as above described.

It will be noted that by reason of the fact that the hydrostatic-hydrodynamic bearing assembly 15 is in its normal assembled position and the construction has been unchanged that it will simulate the conditions of actual operation in which the fluid is returned to the impeller assembly of the pump as shown in FIGURE 1.

RADIAL THRUST LOADER ASSEMBLY

The actual means for simulating or for reproducing the equivalent radial thrust in both magnitude and angle to that which is produced by the impeller during actual operation is accomplished by the radial thrust loader assembly 53.

The radial thrust loader assembly generally designated 53 is a hybrid arrangement wherein a hydrodynamic-hydrostatic thrust bearing means and a rather small impeller 69 are combined.

The combined hydrodynamic-hydrostatic thrust bearing means and impeller are shown in FIGURES 2, 3, 4 and 5 as embodying a hub element designated 90 which is connected to the shaft 4 by means of conventional groove and key 91 and the threaded element 6 identical to the method of attaching the regular pump impeller to the shaft 4 as is shown in FIGURE 1 of the drawings.

The hub 90 is part of the thrust bearing rotor 92 of the radial thrust loader 53 and is so constructed that it extends slightly inwardly to engage the labyrinth elements of a wearing ring 93 which construction is also identical with the arrangement of the hub on the impeller 5 in the pump shown in FIGURE 1.

Figure 5:
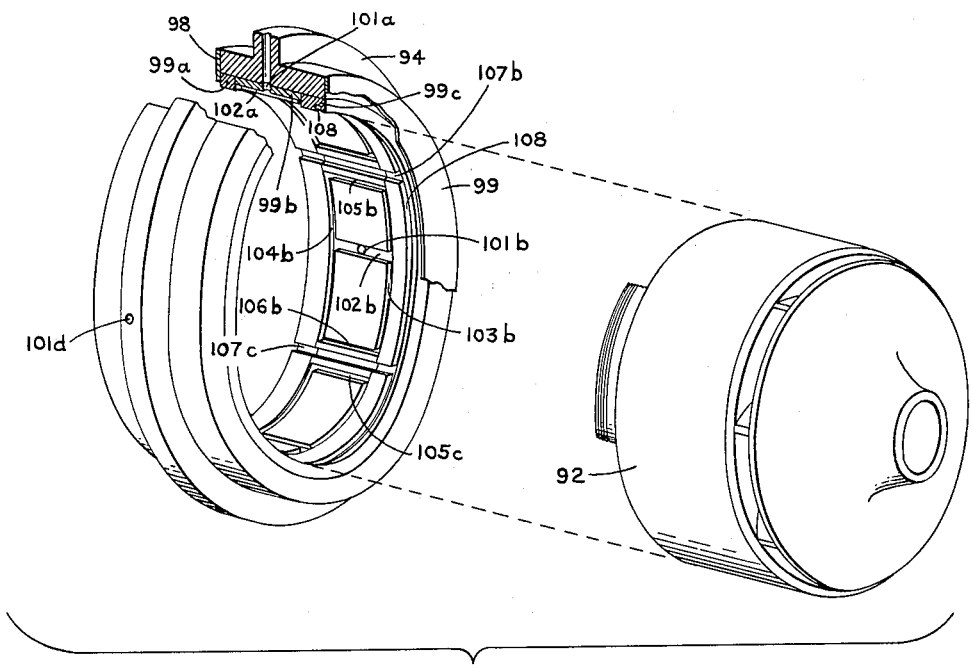
FIGURE 5 is a perspective view partly cut away showing the radial thrust loader.
Figure 6:
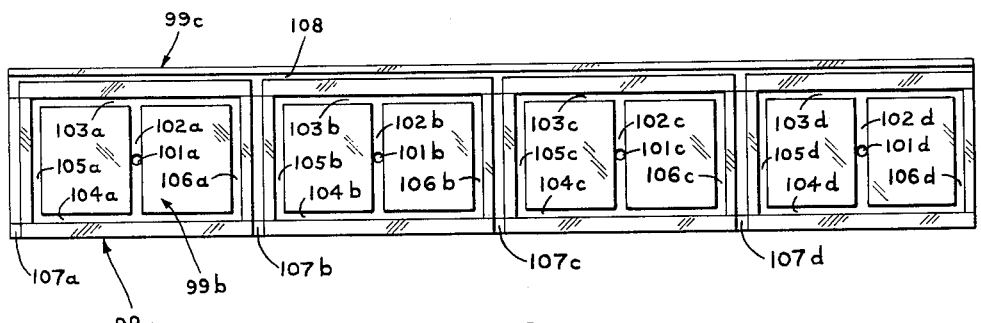
FIGURE 6 is a developed view of the bearing surface of the radial thrust loader.

The outer face of the thrust bearing rotor 92 has a periphery which is smooth and concentric with the shaft 4 of the pump being tested and it will coact with the stator element 77 and shown more fully in FIGURES 5 and 6 of the drawings.

The stator 77 includes an outwardly projecting annular flange 94 for holding the stator in assembled position. It is gripped as shown in FIGURES 2 and 3 by the shoulder 95 on the test housing and a spacer 96 which also serves to hold in the stator assembly 15a of the hydrostatic-hydrodynamic bearing 15 against the shoulder 97 of the seal casing 2 when the bolt members 16 are drawn up to hold the various parts in assembled position.

The stator 77 also has associated therewith a pair of retainer elements 98 and 99 on either side to hold in assembled position the thrust bearing liner elements 99a, 99b, and 99c of the radial thrust loader assembly.

The intermediate bearing liner element 99b is shown in more detail in FIGURES 3, 4, 5 and 6 as having a special configuration for coaction with the rotor 92 of the radial thrust loader assembly 53 to produce the desired effect of providing radial thrust in both magnitude and angle to that which is produced by the impeller during actual operation.

The intermediate bearing liner element 99b has a plurality of openings therein generally designated 101a, 101b, 101c and 101d which openings communicate with the respective ports 76a, 76b, 76c and 76d at one end and with the cross grooves 102a, 102b, 102c and 102d. Thus fluid delivered to the respective ports 73a, 73b, 73c and 73d can flow readily through the ports to the inner face of the intermediate bearing liner element 99b at the pressure to which the fluid is adjusted by the valve elements 74a, 74b, 74c and 74d respectively.

Referring to FIGURE 6 where the interior face of the bearing liner elements 99a, 99b and 99c is shown, fluid which is delivered to the transverse passages 102a, 102b, 102c and 102d of each of the quadrants can pass axially and radially in each of the quadrants by virtue of the interconnected circumferential grooves 103a, 103b, 103c and 103d and 104a, 104b, 104c and 104d and the cross-grooves 105a, 105b, 105c and 105d and 106a, 106b, 106c and 106d.

The fluid from the hydraulic system is delivered to the respective openings 101a, 101b, 101c and 101d at a point on the interior of the bearing liner face intermediate a line of outlet passages generally designated 107a, 107b, 107c and 107d of the intermediate bearing liner portion 99b.

Since these grooves are closed on either side by the elements 99a and 99c the fluid must leak to areas of lower pressure and thus the bearing will operate to exert radial thrust against the rotor portion 92 of the radial thrust bearing loader 53. The leakage will occur not only across to the transverse outlet passages 107a, 107b, 107c and 107d but in addition will occur across the face of bearing liner members 99a and 99c. Leakage across bearing liner member 99a will discharge directly into the collecting chamber 83. Leakage across bearing liner member 99c will collect in a circumferential groove 108 formed therein whence it will pass to the transverse outlet passages 107a, 107b, 107c and 107d as shown in FIGURES 5 and 6.

Since passages 107a, 107b, 107c and 107d communicate with the collecting chamber 83 all the leakage flow between the bearing elements is collected therein and returned to the chamber 64 for recirculation as above described.

The radial thrust bearing loader 53 acts like a hydrostatic-hydrodynamic bearing.

It will be recognized by those skilled in the bearing art that hydrostatic-hydrodynamic bearings can be used either to absorb radial thrust or produce radial thrust and because of this inherent characteristic the radial thrust loading assembly including the combined hydrodynamic-hydrostatic bearing and impeller can be utilized in this closed test facility to duplicate or exceed the radial thrust that is actually developed by the regular full sized impeller 6 when the pump is under the service conditions to which it is to be applied.

In the illustration of the test facility this is clearly indicated by the difference between the bearing element 15 and the radial thrust loader assembly 53.

Bearing elements 15 and 15a operate to absorb radial thrust whereas the assembly 53 is utilized to produce radial thrust. Hence it will become obvious why these two bearings are similar in construction with respect to their bearing surfaces.

Naturally the thrust absorbed by the bearing elements 15 and 15a will be the conventional operating thrust and thus it will be operating under the same conditions that it would operate under if a full size impeller were on the end of the shaft.

In the case of the radial thrust loader assembly 53 the radial thrust to be exerted can be predetermined by adjusting the respective valve members 74a, 74b, 74c and 74d to produce the desired magnitude and angle of radial thrust.

OPERATION

In operation the hydraulic system is first placed into operation before the shaft 4 is rotated by any suitable means. This is accomplished by turning the charging pump 61 so that it will deliver test fluid to the main chamber 64 in the test housing 51 at the desired pressure. By placing the electric heater in operation the fluid for test purposes can be brought up to the desired temperature at which the test must be performed.

When this is accomplished there will be some slight leakage along the shaft in a direction of the seal but this leakage is so minimal that for test purposes it will not be significant.

Once the fluid is at the right pressure and temperature the shaft member can then be rotated at proper speed by the motor indicated at 9 in FIGURE 1 or other suitable means. Except for torque the loads on the shaft and supporting structure then duplicate the loads under normal conditions of service.

It is pointed out that the radial thrust loader assembly 53 simulates the operation of the impeller. However the use of the smaller impeller permits a relatively low driving power to be utilized in place of the normal power which would be required for the full size impeller during actual operation. The reason why lower power requirements result is that the driving assembly need overcome only frictional losses and flywheel inertia during the starting up of the testing period proper, and in operation the water discharged from impeller 69 is used only to operate the radial thrust loader assembly itself and bearing 15.

Thus only small amounts of water are circulated within test housing 51 and the small piping connected thereto.

In conventional test facilities where the motor driven pump utilizes the large impeller itself such as impeller 5 of FIGURE 1, large costly piping circuitry is required to dissipate the energy put into the fluid by the impeller.

The impeller 69 of the radial thrust loader assembly 53 picks up fluid from the space 64 at the eye of the impeller and discharges it into the discharge space 66 which communicates with the discharge outlet 70.

Fluid from the discharge outlet 70 is delivered through connecting lines 71 and 72 to the respective ports 73a, 73b, 73c and 73d. It will be at pressures in excess of the original suction pressure by approximately 20%. The actual quantity of fluid handled by the impeller portion 69 of the radial thrust loader assembly will be approximately 1% of the flow that would be produced by the full size impeller in assembled position.

It is readily seen from FIGURES 3, 4, 5 and 6 that the pressures can be so adjusted with respect to the quadrants of the bearing liner to exert a given pressure in any one of the four directions which pressure can be variable both in magnitude and direction depending upon how the valves 74a, 74b, 74c and 74d are adjusted.

For example, if valve 74a is set at one pressure, for example, wide open, then valve 74c disposed at a diametrically opposite position can be correspondingly adjusted to produce a differential radial force in a direction transverse to the shaft. Similarly, this can be done with the valves which communicate with the ports 73b and 73d of the radial thrust loader assembly 53.

It is because of three factors that the present invention maintains the test conditions substantially similar to that which are obtained during normal operation. These are, first, that the apparatus is rotating with the shaft itself. Second, the various radial thrust conditions can be varied in accordance with equivalent conditions that can be produced by the impeller itself and, third, the hydraulic fluid can be adjusted to provide the same conditions of axial thrust, pressure and temperature that would be produced by the normal fluid being handled by the pump during its actual application.

It will be understood that the invention is not to be limited to the specific construction or arrangement of parts shown but that they may be widely modified within the invention defined by the claims.

What is claimed is:

1. A testing apparatus for rotating equipment having a rotatable shaft comprising a test housing mounted about said shaft having an inlet and a discharge outlet, means connecting said inlet to a source of testing fluid under pressure for delivering test fluid to said housing, means for regulating the temperatures of the test fluid, and a radial thrust loader assembly, said radial thrust loader assembly comprising a thrust bearing rotor mounted on and rotatable with said shaft, and a stator coacting with said thrust bearing rotor, hydraulic means for delivering operating and means coacting with said hydraulic means to regulate the magnitude and angle of radial thrust exerted by said radial thrust loader assembly against said shaft.

2. In a testing apparatus as claimed in claim 1 where said hydraulic means includes, an impeller, said impeller connected to and operative with said radial thrust loader assembly.

3. A testing apparatus for rotating equipment having a rotatable shaft comprising a test housing mounted about said shaft having an inlet and a discharge outlet, means connecting said inlet to a source of testing fluid under pressure for delivering test fluid to said housing, means for regulating the temperature of the test fluid, and a radial thrust loader assembly, said radial thrust loader assembly comprising a thrust bearing rotor mounted on and rotatable with said shaft, and a stator coacting with said thrust bearing rotor, means on said radial thrust loader assembly to permit it to act as a hydrostatic-hydrodynamic thrust bearing with respect to said shaft, means on said radial thrust loader assembly to impart fluid energy to the test fluid and to discharge the same from said discharge outlet, means connecting said discharge outlet to a plurality of opposed points about said radial thrust loader assembly, and means coacting with said conduit means to regulate the magnitude and angular direction of radial thrust exerted by said radial thrust loader assembly against said shaft.

4. A testing apparatus for rotating equipment having a rotatable shaft comprising a test housing mounted about said shaft having an inlet and a discharge outlet, means connecting said inlet to a source of testing fluid under pressure for delivering test fluid to said housing, means for regulating the temperature of the test fluid, and a radial thrust loader assembly, said radial thrust loader assembly comprising a thrust bearing rotor mounted on and rotatable with said shaft, and a stator coacting with said thrust bearing rotor, means on said radial thrust loader assembly to permit it to act as a hydrostatic-hydrodynamic thrust bearing with respect to said shaft, impeller means on said radial thrust loader assembly to impart fluid energy to a relatively small portion of the test fluid and to discharge the same from said discharge outlet, a plurality of diametrically opposed pairs of ports in said radial thrust loader assembly, conduit means connecting said discharge outlet to said pairs of opposed ports, and means coacting with said ports to regulate the magnitude and angular direction of radial thrust exerted by said radial thrust loader assembly against said shaft.

5. In a test apparatus as claimed in claim 4 wherein said last mentioned means includes, adjustable restricting means for regulating the pressure of the fluid delivered in the conduit means to any of said respective parts.

6. In a test apparatus as claimed in claim 4 wherein said radial thrust loader assembly has a predetermined mass and size.

7. A testing apparatus for rotating equipment having a rotatable shaft comprising, a test housing mounted about said shaft having an inlet and a discharge outlet, means connecting said inlet to a source of testing fluid under pressure for delivering test fluid to said housing, means for regulating the temperature of the test fluid, a radial thrust loader assembly, said radial thrust loader assembly comprising a thrust bearing rotor mounted on and rotatable with said shaft, and a stator coacting with said thrust bearing rotor, impeller means to impart fluid energy to a relatively small portion of the test fluid and to discharge the same from said discharge outlet, a plurality of diametrically opposed pairs of ports about said radial thrust loader assembly, conduit means connecting said discharge outlet to said pairs of ports, adjustable restricting means for regulating the pressure of the fluid delivered in the conduit means to any of the said ports, and individual means of fixed volume, each communicating with an individual port, and disposed circumferentially on said stator, each from its respective port, said fluid to exert a uniform pressure over a restricted quadrant of the circumferential surface of said thrust bearing rotor whereby the magnitude and angular direction of radial thrust exerted by said radial thrust loader assembly against said shaft is regulated.

8. An apparatus for the endurance testing of a pump having a rotatable shaft comprising, an impeller connected to and rotatable with said shaft, and a casing about said impeller end of the shaft, a test housing to replace said casing during test periods, a radial thrust loader assembly to replace said impeller during test periods, means for delivering test fluid to said test housing, means for maintaining said test fluid at a predetermined test temperature, and means operatively associated with said test housing and with said thrust loader assembly to deliver operating test fluid to said radial thrust loader assembly and to regulate the magnitude and angular direction of radial thrust exerted against the pump shaft by said radial thrust loader assembly through the media of the test fluid.

9. In a test apparatus as claimed in claim 8 wherein said radial thrust loader assembly includes, means to act like a hydrostatic-hydrodynamic thrust bearing, and means to impart fluid energy to said test fluid and to provide delivery of the test fluid to said radial thrust loader assembly.

10. In a test apparatus as claimed in claim 8 wherein said radial thrust loader assembly has a size and mass equivalent to the impeller it replaces during its use for test periods.

11. In a test apparatus as claimed in claim 8 wherein the test fluid is maintained at any given temperature by means of an electrical heating means disposed in said test housing.

12. An apparatus for the endurance testing of a pump having a rotatable shaft comprising, a test housing mounted about said shaft having an inlet and a discharge outlet, means connecting said inlet to a source of test liquid under pressure for delivering the test liquid to the housing, means for regulating the temperature of the test liquid, and a radial thrust loader assembly said radial thrust loader assembly comprising a thrust bearing rotor mounted on and rotatable with said shaft, and a stator coacting with said thrust bearing rotor, hydraulic means for delivering the test liquid under pressure to the radial thrust loader assembly to operate it, and means coacting with said hydraulic means to regulate the magnitude and angle of radial thrust exerted against the shaft by the radial thrust loader assembly through the media of the test liquid.

References Cited by the Examiner

UNITED STATES PATENTS

| | | | |
|---|---|---|---|
| 3,015,524 | 1/1962 | Slayter et al. | 308—9 |
| 3,127,761 | 4/1964 | Gordon | 73—9 |
| 3,180,135 | 4/1965 | Cain et al. | 73—9 X |

LOUIS R. PRINCE, *Primary Examiner.*

DAVID SCHONBERG, *Examiner.*